United States Patent Office 3,167,335
Patented Jan. 26, 1965

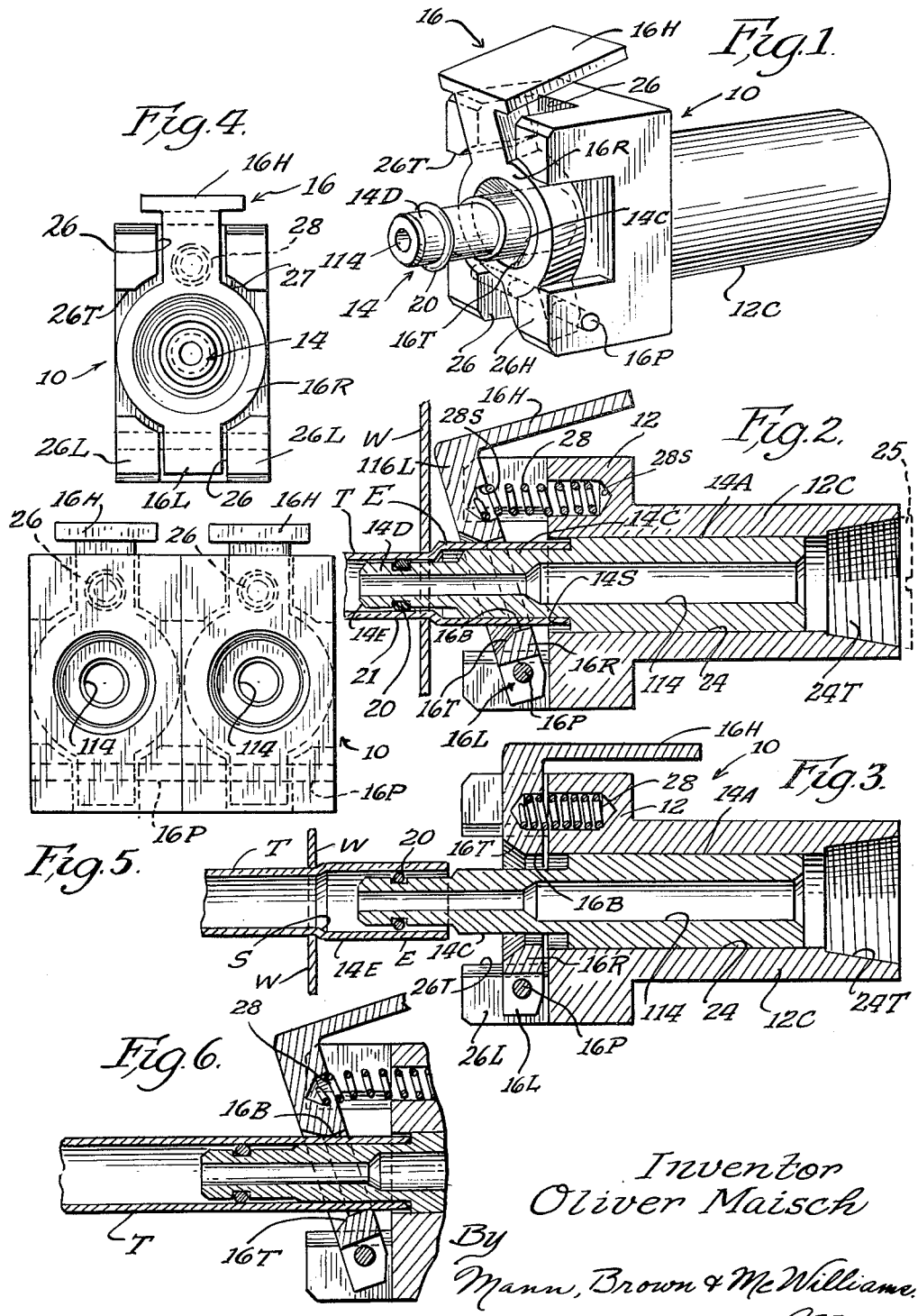

3,167,335
INTERNAL TUBE SEAL AND CONNECTOR
Oliver Maisch, Chicago, Ill., assignor to Tuthill Pump Company, Chicago, Ill., a corporation of Illinois
Filed Sept. 18, 1961, Ser. No. 138,727
2 Claims. (Cl. 285—317)

This invention relates to a tube seal and connector for temporary association with the ends of a tube for pressure testing of tubes and weldments in tubular assemblies.

When condensers, evaporators, heat exchangers, or other types of tubular units have been completely assembled, or at intermediate stages of manufacture, it is common practice to temporarily seal the ends of the tubes so that relatively high testing pressures may be applied to the tubes to make sure that leaks have not developed therein. The pressures used for testing purposes are relatively high, and it is, therefore, necessary that the testing device or connector be anchored on the end portion of the tube and that means be provided in the connector for developing a seal that is sufficiently tight to withstand the high pressure that is to be applied.

In my prior Patent No. 2,819,733, patented January 14, 1958, a tube seal and connector is disclosed that is highly efficient in most of the situations encountered in the sealing and testing of tubes, but in the use of the tube seal and connector of my aforesaid prior patent, it is necessary that a substantial length of the end portion of the tube be exposed so that the tube may extend for a considerable distance into the body of the connector. It has been found, however, that in certain instances the length of the exposed end portion of the tube is insufficient and tubes are spaced on centers too close for use of the end seal provided in my aforesaid patent.

A particularly troublesome situation is encountered in heat exchangers where the ends of the tubes of the heat exchangers are projected through an outer wall of the heat exchanger on close centers. In such situations the tube is often expanded or offset on the outer side of the wall to provide what amounts to a connector cup that is to be used in subsequent manufacturing operations for connecting the heat exchanger in the refrigerating system. This expanded or offset portion of the tube is relatively short, being in most instances of a length equal to about 1¼ to 1½ times the diameter of the expanded portion, and the internal diameter of the expanded or offset portion is usually equal to the normal outer diameter of the tube so that a tube end made from the same original diameter of tube may be inserted into the socket or cup for association therewith in the usual manner.

Where the exposed length of the tube is so extremely short, the tube end cannot be extended into the inside of a tube seal and connector of the kind shown in my aforesaid patent, and it is therefore the primary object of the present invention to provide a tube seal and connector that may be utilized efficiently in situations where but a short length of the tube end is exposed, and a further important object is to provide a tube seal and connector that may be used on adjacent tubes located on centers too close for use of end seals previously used.

Another and related object of this invention is to provide a tube seal and connector where highly efficient anchoring means cooperate with the exposed tube end, while sealing means of the O ring type cooperate with internal surfaces of the tube to produce the desired seal, and an object related to the foregoing is to provide such a device that is simple in form and structure, which may be made economically, and in which the number of moving parts is minimized.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a perspective view of a tube seal and connector embodying the features of the invention;

FIG. 2 is a longitudinal sectional view of the device in its sealing position on an offset tube that is to be sealed;

FIG. 3 is a view similar to FIG. 2 showing the device as it is being moved into position on a tube;

FIG. 4 is a front end view of the device;

FIG. 5 is a rear end view of a pair of the devices in place on a pair of closely spaced tube ends; and FIG. 6 is a view similar to FIG. 2 showing an alternative construction.

The invention is disclosed herein in FIGS. 1 to 5 as embodied in a tube seal and connector 10 that is simple in form and construction and which may be used in situations where extremely high testing pressures are contemplated. The tube seal and connector 10 is adapted particularly for cooperation with a commonly encountered type of tube end wherein a relatively short expanded end E of a tube T is exposed on one face of a wall W through which the tube T extends, but it is to be noted that the device of this invention also finds utility in many instances where the exposed tube end is of normal diameter, or in other words, has not been offset or expanded, as in FIG. 6. The end E of the tube T is customarily expanded or offset in a radial direction so that the internal diameter of the extended end E is substantially equal to or just slightly greater than the outer diameter of the tube T. The tube seal and connector 10 of this invention is arranged to take advantage of the form of the end E and the shoulder S that connects the end E with the normal diameter portion of the tube T to simplify the mounting of the unit 10 on the tube in the desired sealing relation. The extended offset end E is normally quite short, in the order of 1¼ to 1½ times the diameter of the tube, and the connector 10 of the present invention is particularly suited for cooperation with tubes having such relatively short exposed ends that have been expanded or offset in the general manner shown in the drawings, and in those instances where the tubes are located on close centers.

The tube seal and connector 10 has an elongated body 12 having a sealing pilot 14 extending from one end thereof, and as will be described, the sealing pilot 14 is adapted to be inserted endwise into a tube T for sealing cooperation with inside surfaces of the tube while locking or anchoring means 16 carried on the body 12 engage outer surfaces of the expanded end E of the tube to lock the device in its operative sealing position on the tube. The body 12 and the sealing pilot 14 are shown as being separately formed parts which may be economically formed, but in the finally assembled product the body 12 and the sealing pilot 14 are permanently fixed together as will be described.

The pilot 14 is formed as an elongated thick-walled tube having an axial passage 114 therethrough, and the tube has sections of successively reduced outer diameter arranged progressively from right to left as shown in FIG. 2. Thus, the right hand portion 14A of the pilot 14 constitutes an aligning or anchoring portion, and just to the left of the portion 14A, a filler portion 14C is formed which is of reduced outer diameter so as to provide a stop shoulder 14S at its right hand end, the filler portion 14C having a diameter such that it will slide snugly yet easily into the enlarged end E of the tube T. To the left of the filler portion 14C, the pilot 14 is further reduced to form a sealing end portion 14D that has an outer diameter less than the diameter of the tube T and so related to the diameter of the tube T that an O ring 20 may be mounted according to usual standards in an O ring groove 21 formed in the sealing end portion 14D. The end of the sealing portion 14D is tapered or rounded as 14E to facilitate entry of the pilot into a tube T that is to be sealed.

The body 12 is made from bar stock of the desired cross section cut to the proper length and having an axial bore 24 formed therethrough to receive the pilot 14 as will be described, and at its right hand end the bore 24 is internally threaded as at 24T to receive either a conventional pressure connection, or a closure plug 25, as indicated in dotted outline in FIG. 2. In the present instance stock from which the body 12 is made is of rectangular cross section so that two plug seals and connectors 12 may be used on closely spaced tubes T, as indicated in FIG. 5. The anchoring means 16 are, of course, carried on the other or left hand end of the body 12, and to provide for such mounting, the left hand end of the body 12 has a slot 26 formed therein transversely of the bore 24 in an up and down relation, and a transverse slot 26T is formed which intersects the slot 26. Moreover, the left end of the body 12 is counterbored at 27 to a diameter substantially greater than the diameter of the end E of the tube T. Thus the slots 26 and 26T define corner lugs 26L, as will be evident in FIGS. 1 and 4, and these lugs function in the mounting and guiding of the anchoring means 16, as will be described.

It should be noted that the bore 24 has a diameter somewhat greater than the outer diameter of the end E of the tube to provide clearance for the tube T as the device 10 is put in place on the tube, as shown in FIG. 2.

The anchoring or clamping means 16 comprises a ring 16R disposed within and movable freely in the counterbore 27 and having a lower lug 16L extended downwardly into the lower portion of the slot 26 between the two lower lugs 26L. The lug 26L is pivoted with loose fit on a pin 16P extended across the lower portion of the slot 26 and through the two lower lugs 26L. The ring 16R also has an upper lug 116L projecting upwardly between and slightly beyond the two upper lugs 26L, and a handle portion 16H rigid with the lug 116L is extended to the right in spaced relation to the upper surface of the body 12. A spring 28, having its opposite ends disposed in sockets 28S in the lug 116L and the bottom of the slot 26, acts to urge the anchoring means 16 to its operative or locking position of FIG. 2, as will be explained. The inner edge of the ring 16R is formed with relatively sharp edges for biting contact with the tube end E in the clamping operation. These sharp edges are provided by a tapered surface 16T and a bore 16B formed in the ring 16R, and because of this a tapered surface 16T is afforded to guide the end of a tube through the bore 16B of the ring 16R. The bore 16B is of a diameter just slightly greater than the tube on which it is to be locked.

After the body 12 and the pilot 14 have been formed as above described, and either before or after the mounting of the anchoring means 16 on the body, the pilot 14 is inserted endwise into the bore 24, and forced endwise in the bore 24 to the desired relation and with the portion 14A of the pilot 14 in a gas-tight press fit relationship in the bore 24. This fixes the pilot 14 in its final and permanent relation to the body 12.

To minimize the width of the connector 10 the width of the bar stock from which the body 12 is formed is chosen as being equal to the outer diameter of the ring 16R, FIG. 4, and to reduce the weight of the device, the portion of the bar stock to the right of the spring socket 28S may be turned to cylindrical form as at 12C.

When the connector 10 is to be put in position on the end of a tube T, the handle 16H of the anchoring means is pressed toward the body 12 to the relation shown in FIG. 3. The left or projecting end of the pilot 14 is then inserted into the enlarged end E of the tube T, and although the O ring 20 projects radially beyond the portion 14D, there is still sufficient clearance to enable the O ring 20 to pass the end edge of the tube without cutting or damaging the O ring. In further inward or left hand movement of the device, the O ring engages the sloping shoulder S of the tube so that the O ring 20 rolls freely and without damage into the normal diameter portion of the tube, where it comes to rest in the position shown in FIG. 2. During such mounting movement, the ring 16R moves into an encircling relation with respect to the offset or enlarged end portion E of the tube, while the filler portion 14C of the pilot 14 enters the enlarged end E with a snug fit that is important in assuring that the anchoring means 16 will not distort or objectionably bend the enlarged end E. The handle 16H of the device is then released so that a preliminary wedging or anchoring action is attained by releasing of the anchoring member toward the position shown in FIG. 2. Then, when pressure is applied within the tube T, either through the connecting opening 24T, or through a connection to the other end of the tube, the pilot 14 and the body 12 are urged as a unit in a right hand direction to produce an increased anchoring action with respect to the tube end E. The device 10 is thus held firmly in position on the expanded tube end E, and the desired sealing action is attained within the normal diameter portion of the tube T through the action of the O ring 20.

The foregoing description is directed specifically to the use of the present connector with expanded or offset tubes, but it is important to note that it may be used with plain end tubes if the application is such that the tube ends may be chamfered to avoid damage to the O rings as the connector is put in position. For such use the form of the pilot 14 is modified somewhat, as shown in FIG. 6, so that the filler portion 14C of the pilot 14 is of a smaller diameter which will fit into the tube T.

From the foregoing description, it will be apparent that the present invention provides a new and improved tube seal and connector that is extremely simple and economical in structure and which is adapted for quick, easy, and efficient cooperation with plain end tubes or with the expanded or offset tube ends. Moreover, it will be evident that the device that is thus provided is particularly useful where tube ends are relatively short lengths and where tubes on closely spaced centers are to have connectors associated therewith.

This application discloses the improvement over the internal tube seal and connector disclosed in my copending application Serial No. 48,488, filed August 9, 1960, and now issued as Patent No. 3,124,375, granted March 10, 1964.

Thus, while preferred embodiments of the present invention have been illustrated herein, it is to be understood that changes and variations may be made by those skilled in the art without departing from the spirit and scope of the appending claims.

I claim:
1. In a high pressure tube seal and connector for association with a relatively short projecting end of a metal tube, an elongated body having a longitudinal opening therethrough with a counterbore at one end of the body substantially larger than the tube end with which the connector is to be associated and into which counterbore such a tube end may extend, said body having an annularly continuous wall defining a portion of said opening located adjacent said counterbore, an anchoring ring disposed in said counterbore and pivoted at one edge on the body for shifting movement from a mounting position perpendicular to the counterbore axis to an angular clamping position, spring means reacting between said body and said ring normally to urge said ring toward its clamping position, an elongated pilot structure having a lengthwise throughbore, said pilot structure being disposed within said opening in an axially fixed and peripherally sealed relationship with said body by means of a permanent force fit between said pilot structure and said continuous annular wall, said pilot structure having a filler portion projecting outwardly through said counterbore and said ring and extending beyond said body, said filler portion having outwardly facing peripheral shoulder corresponding in size to said tube end, said filler portion terminating in a reduced end portion equipped with an O ring seal such that when said pilot structure is inserted into an end portion of such a tube, said shoulder engages an end edge of the tube, said anchoring ring encircles said end portion, said filler portion fills the end portion of the tube to react radially against the anchoring ring and prevent distortion of such end portion by the anchoring ring, and said reduced end portion extends inwardly in peripheral clearance relation within the tube with the O ring seal on said reduced end portion having sealing cooperation internally with the tube, with said connector upon being supplied internally with fluid under pressure developing unitary endwise movement of said body and said pilot structure in a direction away from said tube to re-inforce engagement of said anchoring ring on said tube end portion.

2. An arrangement as recited in claim 1 and wherein said body has an elongated rectangular head region in which said counterbore is located, said head region having a width corresponding to the diameter of said anchoring ring, and said body having its remaining portion of cylindrical form and of a diameter less than the width of said head region whereby such connectors are concurrently applicable upon closely spaced side-by-side mounted tube ends.

References Cited by the Examiner
UNITED STATES PATENTS

| | | | |
|---|---|---|---|
| 2,819,733 | 1/58 | Maisch | 285—317 |
| 2,877,027 | 3/59 | Bagnell | 285—243 |
| 3,124,375 | 3/64 | Maisch | 285—347 |

CARL W. TOMLIN, *Primary Examiner.*